Nov. 8, 1938.  F. A. GROUNDS  2,135,871
DUMP TRUCK TRAILER
Filed Feb. 9, 1934  3 Sheets-Sheet 1

F. A. Grounds
Inventor
Jesse R. Stone
&
Lester B. Clark
Attorneys

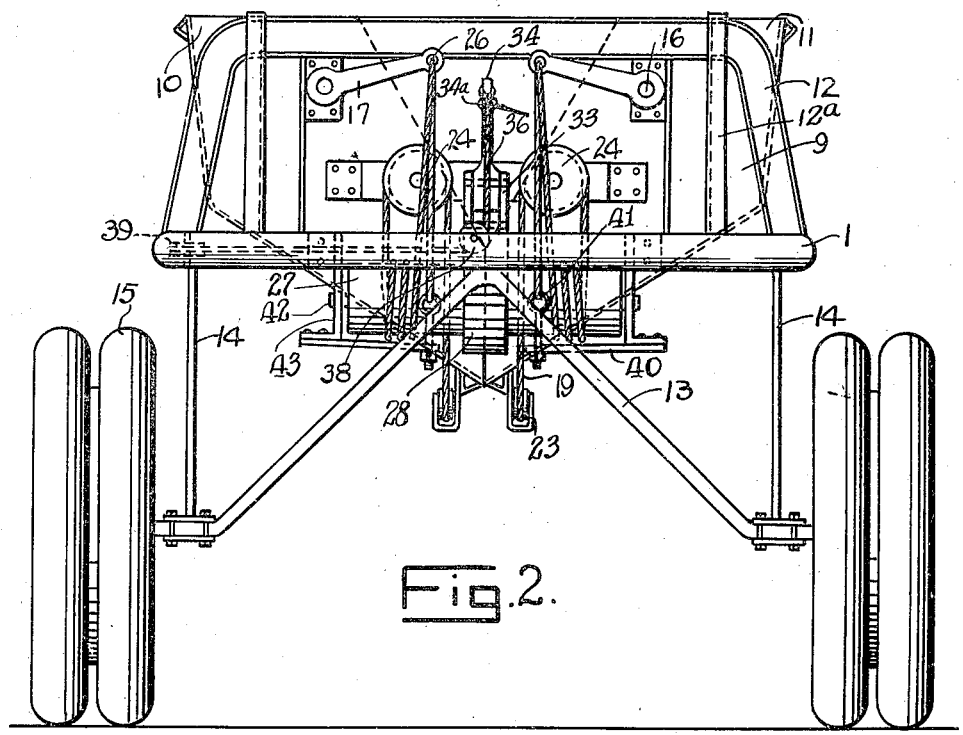

Nov. 8, 1938.　　　　F. A. GROUNDS　　　　2,135,871
DUMP TRUCK TRAILER
Filed Feb. 9, 1934　　　　3 Sheets-Sheet 3
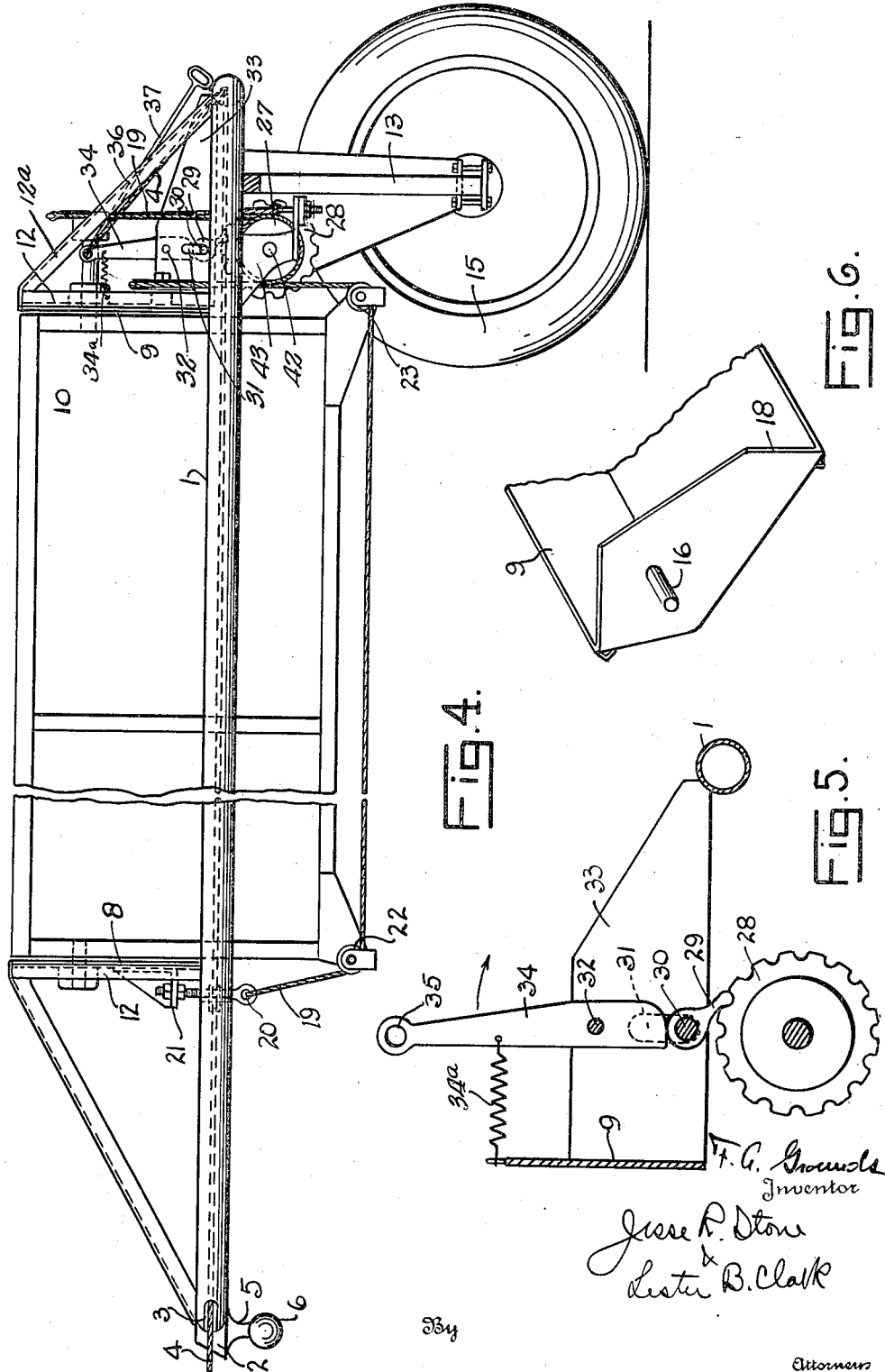

Patented Nov. 8, 1938

2,135,871

UNITED STATES PATENT OFFICE 2,135,871

DUMP TRUCK TRAILER

Fred A. Grounds, Lufkin, Tex., assignor, by mesne assignments, to The Martin Wagon & Trailer Company, Lufkin, Tex., a corporation of Texas Application February 9, 1934, Serial No. 710,462

4 Claims. (Cl. 298—25)

My invention relates to dump trailers to be employed either alone or in connection with a truck or trailer which furnishes the support for the forward end of the trailer. The invention is illustrated in connection with a trailer of this character.

It is an object of the invention to provide a trailer which is operable automatically both to open and dump the load, and to again close to receive the next load.

Another object is to provide a dump trailer which is adapted to open in such manner as to dump the contents completely, irrespective of the load. I desire to provide a dump trailer which will operate with all kinds of materials which are to be handled.

Another object is to provide means whereby both the operating parts of the box of the trailer are operated simultaneously and to the same extent.

Another object is to provide means whereby the driver of the truck may control the opening of the box for dumping the load and again control the closing and locking of the box in closed position after the load has been dumped.

Another object is to provide a dump box for trailers which may be opened so as to allow a maximum of space below for the load to discharge, and to hold the box in open position until the same is entirely free from its contents.

In the drawings herewith I have shown a preferred embodiment of the invention wherein Fig. 1 is a top plan view of the invention.

Fig. 2 is a rear end view of the same.

Fig. 3 is a rear end view similar to that shown in Fig. 2, but with the box in dumping position.

Fig. 4 is a side elevation of the trailer in closed position.

Fig. 5 is a sectional detail illustrating the construction of the mechanism employed in latching the box in either open or closed position.

Fig. 6 is a broken perspective detail showing the forward end of one of the sections of the box.

Figure 1:
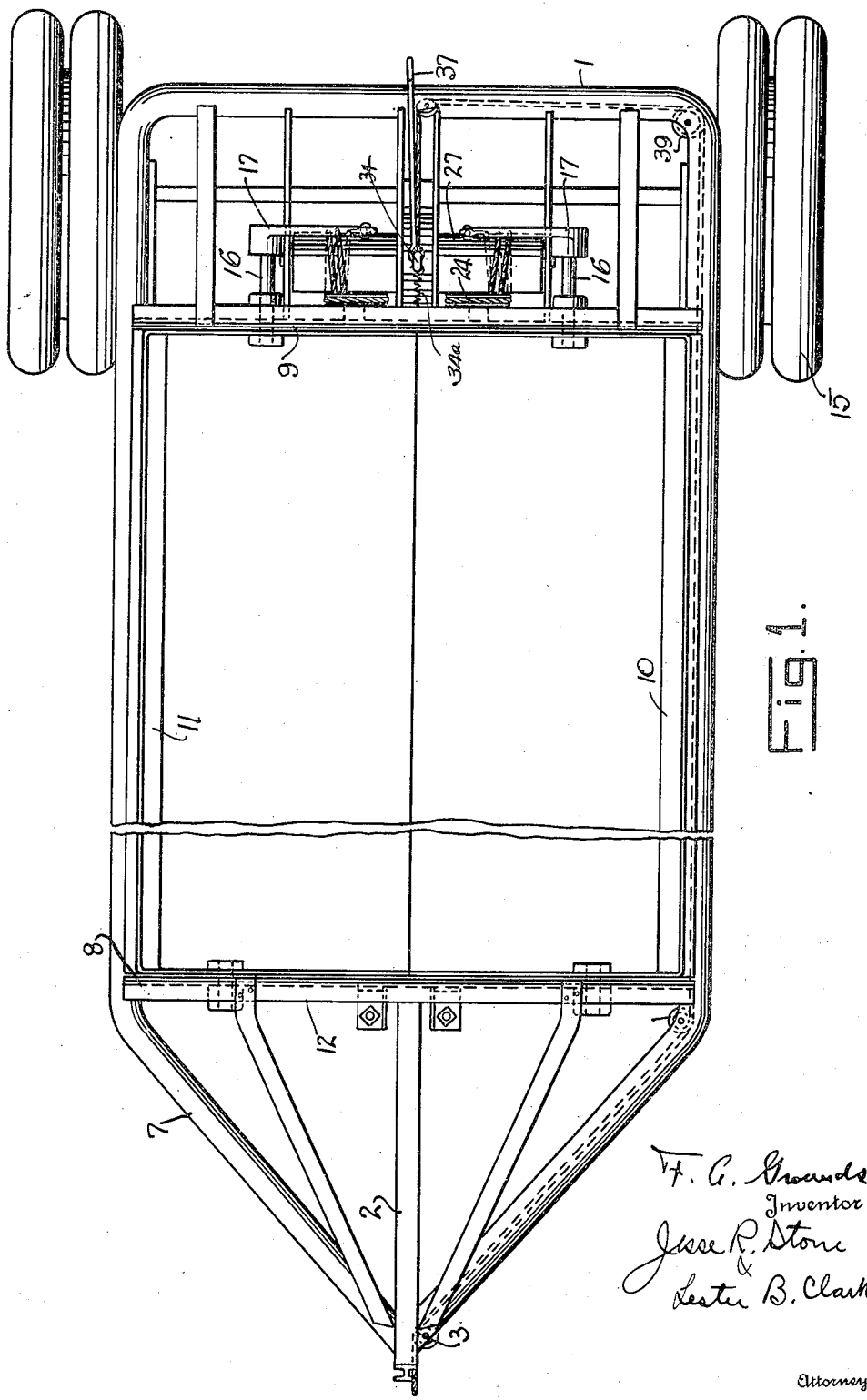

My trailer comprises a frame 1 preferably of tubular material, which, as shown in Fig. 1, is approximately rectangular in shape, but has its forward ends inclined toward each other to provide a support for the reach or connecting bar 2. These forwardly inclined members have an opening shown at 3 near the forward end through which an operating cable 4 may extend as will be later noted. The reach or connecting bar 2 has at its forward end a downwardly extending arm 5 with a ball 6 thereon adapted to fit within a socket upon the truck thus forming a flexible and universal connection.

Within the frame and adjacent the inclined arms 7 are transverse connecting bars 8 at the forward end, and at 9 at a point spaced from the rearward end. These frame members comprise plates of sheet iron and serve as a support for the two swinging boxes 10 and 11. These end plates project upwardly above the frame and are supported by approximately U-shaped frame members 12 which are connected at their lower ends rigidly with the frame 1. The frame 12 is also braced by diagonally extending braces 12a.

This frame is supported upon an axle 13 which, as seen particularly in Figs. 2 and 3, is in the shape of an inverted V, thus raising the frame sufficiently above the ground to allow the box sections to open downwardly. In addition to the axle which connects with the frame along its longitudinal axis there are upright support posts 14 at each side of the axle and closely adjacent the walls 15.

The sections 10 and 11 of the box have at their forward ends longitudinally extending trunnions or bearing posts 16. At their rearward ends they have similar posts 16' which project through the rearward plate 9 and have crank arms 17 thereon through which the rotation of the trunnions may be controlled.

As will be noted from Figs. 3 and 4 the box sections are formed with lateral side plates which converge downwardly at a slight angle to a point adjacent the frame and then converge toward each other at a sharp angle bringing them together at a point spaced somewhat below the frame. The ends of the boxes are shaped to contact with each other along a forward edge indicated at 18 in Fig. 6. From there they slope apart to the upper edge which is approximately horizontal when the sections of the box are closed.

Each of these box members are equipped with means for controlling the opening thereof. This means includes a cable on each of said sections, said cable 19 being attached at the forward end of the frame to an eye-bolt 20 secured to the frame at 21. Said cable passes downwardly from the eye-bolt and around a pulley 22 on the forward end of each box section adjacent the inner edge thereof. From there it passes over a similar pulley 23 at the rearward end of the section of the box. From there the cable extends upwardly as shown in Fig. 3 about a pulley 24 secured to the rearward portion of the frame plate. From the pulley 24 the cable passes downwardly around the roller or sheave 27 and from thence outwardly for engagement through an eye 26 at the outward end of the lever 17 and down for attachment to a bracket or arm 40 by means of an eyelet 41 thereon. It will be obvious, therefore, that when the two sections of the box are operated they will operate in unison, each one to the same extent as the other.

The roller or sheave 27 is mounted on trunnions 42 rotatable in supporting brackets 43 depending from the end plates 9 of the frame. It has midway between its ends a ratchet wheel 28, which is adapted to cooperate with a pawl 29 mounted upon a pivot pin 30 slidable longitudinally within the opening 31 as shown in Fig. 5. Above the pawl and pivoted upon a pin 32 on a supporting plate 33 is a lever 34. The lower end of this lever is rounded on one side to engage with the upper end of the pawl 30 so that when the lever is swung as shown by the arrow in Fig. 5 it will release the pawl and allow it to move upwardly out of engagement with the ratchet wheel 28. The pawl may, however, be latched in position extending in either direction from its pivot 30 by the swinging of the lever into upright position. The upper end of the lever 34 has an opening 35 therein to receive a cable 36, and also a hand rod 37. The cable 36 extends from the lever downwardly about a pulley 38 set into the upper wall of the tubular frame member 1. It is journaled to form a roller about which the cable may pass into the interior of the tubular frame member. From there it moves around a pulley indicated at 39 in dotted lines in Fig. 2, and from thence forwardly along the frame to issue through the opening 3 at the forward end of the frame, as indicated at 4. It is understood that this cable is carried forward for engagement with the operator by means of a lever or otherwise, so as to move the lever arm 34 when desired. Also, if the lever is to be operated by a workman on the ground, the rod 37 may be employed to perform the same operation.

When the load is delivered into the box of the trailer the two sections will be in closed position, as shown in Fig. 2, with the latching pawl 29 engaged so as to prevent unreeling of the cable to allow the sections to open. When the load has been driven by the operator to the position where it is to be dumped, the operator may dump the load by pulling on the cable 4 to move the lever 34 out of the pawl-engaging position and allow the pawl to move upwardly and allow the ratchet wheel 38 to rotate and thus allow the weight of the load in the box to throw the two sections downwardly into the Fig. 3 position and allow the load to drop directly downward away from the box. It will be seen that these side members may move outwardly apart so as to allow free dropping and prevent the sticking of the load between the two sections of the box. After the lever has been pulled to allow the pawl to reverse and thus allow the box to open, the lever will be released and it will be swung back to pawl-locking position by the spring 34a. From this position it may be pulled again when the box is ready to close. Thus when the two sections of the box have reached their open position the pawl 29 will engage the ratchet wheel 28 and prevent movement in the other direction to allow the box sections to close, which they tend to do by gravity when the load is delivered. The driver may then move the trailer forwardly away from the load which has been dumped and then allow the sections to swing into closed position. To do this he again pulls on the cable to move the lever 34 into unlatching position and thus allow the ratchet wheel to move in the opposite direction as the sides of the box swing closed. When the box has been closed the pawl which has swung to locking position will again latch the wheel 28, and the sheaves connected therewith, from rotation, and will prevent their opening when the load is placed in the box.

While cables are shown and described to control and operate the box and latching mechanism, it will be apparent that any equivalent flexible member such as a chain or rope may be employed.

It will be seen that the operation of the box sections 10 and 11 to deliver the load is through the weight of the load acting on the box sections to swing them apart, and that they will automatically close through gravity due to the pivoting of the two sections off center so that they swing to the Fig. 2 position by the force of gravity alone. The trunnions 16 are positioned so that the center of gravity of each section is on the outer side thereof away from the center line of the truck. The weight of each section thus swings it to the position shown in Fig. 2 with the sections closed.

The cables 19 tend to support the box sections in closed position and to unreel and allow them to open when the load is dumped. The latching of the sheave over which the cables 19 are passed makes it possible to control the position of the box sections without difficulty and assures furthermore that they operate exactly in unison.

The advantages of the structure lie in the fact that the box sections open and close automatically and that they swing to an open position which allows the load to drop free of the box and prevent any adherence of the load to the box when dumping is desired. Furthermore, the position of the sections of the box after the load has been dumped permits the driver to move free of the load which has been dumped without scraping or catching thereon when the trailer is moved away. The operation is controlled by the driver without difficulty and without the necessity of any manual reeling or unreeling of the control cables upon the box. The further advantages of this structure will be obvious to those skilled in the art.

What is claimed as new is

1. A dump truck including a portable support, a frame thereon, end plates on said support, a pair of box sections having their lower walls inclined downwardly to meet along the axial line of said truck, pivots for said sections in said end plates, said pivots being mounted on said sections to place the center of gravity of said sections on the side of said pivots away from the axial center of the box to cause said sections to swing together by gravity, arms on the pivots at the rear end of said sections, a reel, cables on said reel connected with said arms, and controlling the movement of said sections to cause said sections to move simultaneously and means to control the movement of said cables to hold said cables and sections stationary in any adjusted position.

2. A dump vehicle including a portable frame, box sections pivotally supported at their ends and overbalanced to cause their inner lower edges to swing together by gravity, a sheave on said frame, cables connected with the forward side of said frame and passing beneath said sections and about said sheaves, levers on the rearward pivotal supports of said sections, said cables being connected with said levers, a ratchet wheel on said sheave, a pawl adapted to engage said ratchet wheel, and means to control said pawl to latch said wheel to hold said sections in either open or closed positions.

3. A dump truck including a portable support, a frame thereon, a pair of box sections, trunnions on said sections pivoted in said frame to one side of the center of gravity to cause said sections to swing together by gravity at their adjacent lower sides, said sections being adapted to be swung apart by the weight of a load therein, means to cause said sections to move simultaneously to an equal extent including levers on said trunnions, cables secured to said levers, a sheave for said cables about which said cables are reeled, said cables engaging slidably about the lower ends of each of said sections, and means to latch said sheave.

4. A dump truck including a portable support, a frame thereon, a pair of box sections, trunnions on said sections pivoted in said frame to one side of the center of gravity to cause said sections to swing together by gravity at their adjacent lower sides, said sections being adapted to be swung apart by the weight of a load therein, means to cause said sections to move simultaneously to an equal extent including levers on said trunnions, cables secured to said levers, a sheave for said cables about which said cables are reeled, said cables engaging slidably about the lower ends of each of said sections, means to latch said sections in both open and closed positions and means within the control of the driver to disengage said latching means.

FRED A. GROUNDS.